United States Patent
Nakajima et al.

(10) Patent No.: US 12,172,359 B2
(45) Date of Patent: Dec. 24, 2024

(54) PRODUCTION METHOD OF POLYPROPYLENE SHEET

(71) Applicant: SunAllomer Ltd., Tokyo (JP)

(72) Inventors: Takeshi Nakajima, Kanagawa (JP); Masayuki Ikeda, Kanagawa (JP); Akihiro Katagiri, Kanagawa (JP)

(73) Assignee: SunAllomer Ltd., Tokyo (JP)

( * ) Notice: Subject to any disclaimer, the term of this patent is extended or adjusted under 35 U.S.C. 154(b) by 689 days.

(21) Appl. No.: 17/283,938

(22) PCT Filed: Oct. 9, 2019

(86) PCT No.: PCT/JP2019/039822
§ 371 (c)(1),
(2) Date: Apr. 8, 2021

(87) PCT Pub. No.: WO2020/075755
PCT Pub. Date: Apr. 16, 2020

(65) Prior Publication Data
US 2021/0387396 A1    Dec. 16, 2021

(30) Foreign Application Priority Data

Oct. 9, 2018   (JP) .................................. 2018-190704

(51) Int. Cl.
*B29C 48/21*       (2019.01)
*B29C 48/00*       (2019.01)
(Continued)

(52) U.S. Cl.
CPC .......... *B29C 48/21* (2019.02); *B29C 48/0018* (2019.02); *B29C 48/0021* (2019.02);
(Continued)

(58) Field of Classification Search
CPC .......... B32B 2307/518; B32B 2250/05; B29C 55/12; B29C 48/0018; B29C 48/0021;
(Continued)

(56) References Cited

U.S. PATENT DOCUMENTS

| | | |
|---|---|---|
| 5,283,017 A | 2/1994 | Rohleder et al. |
| 2005/0249963 A1 | 11/2005 | Obata et al. |
| 2013/0196168 A1 | 8/2013 | Hikosaka et al. |

FOREIGN PATENT DOCUMENTS

| | | |
|---|---|---|
| CA | 2724025 A1 | 11/2009 |
| JP | S55154131 A | 12/1980 |

(Continued)

OTHER PUBLICATIONS

EESR of EP19871892.6 issued on May 4, 2022 (8 pages).
Chinese Office Action issued on Oct. 13, 2022 for the corresponding Chinese Patent Application No. 201980066336.9 (23 pages).
Indian Application 202117020233 Office Action issued on Oct. 29, 2021 (5 pages).

(Continued)

*Primary Examiner* — Atul P. Khare
(74) *Attorney, Agent, or Firm* — Workman Nydegger

(57) ABSTRACT

A method for producing a polypropylene sheet having a thickness of 0.5 to 5 mm, the method comprising;
  a step 1 of preparing a precursor in which a first biaxially oriented polypropylene film having a thickness of less than 0.15 mm and a melting point Tmh and a second biaxially oriented polypropylene film having a thickness of less than 0.15 mm and a melting point of Tml are alternately laminated;
  a step 2 of bringing a heating element into contact with an outermost layer of the precursor to thermally seal layer of the films, where $$Tmh - Tml \geq 8 (° C.)$$

where the melting point is measured by a differential scanning calorimeter (DSC) under the condition at 30° C. to 230° C. and a heating rate of 10° C./min.

9 Claims, 3 Drawing Sheets

(51) Int. Cl.
*B29C 48/08* (2019.01)
*B29C 65/00* (2006.01)
*B29C 65/18* (2006.01)
*B32B 37/04* (2006.01)
*B29K 23/00* (2006.01)
*B32B 27/08* (2006.01)

(52) U.S. Cl.
CPC .............. *B29C 48/08* (2019.02); *B29C 65/18* (2013.01); *B29C 66/41* (2013.01); *B32B 37/04* (2013.01); *B29K 2023/12* (2013.01); *B29K 2995/0053* (2013.01); *B29K 2995/0097* (2013.01)

(58) Field of Classification Search
CPC ......... B29C 48/21; B29C 65/18; B29C 66/41; B29C 66/45
See application file for complete search history.

(56) References Cited

FOREIGN PATENT DOCUMENTS

| | | |
|---|---|---|
| JP | H04173126 A | 6/1992 |
| JP | H05254026 A | 10/1993 |
| JP | 2012-96526 A | 5/2012 |
| JP | 2017186561 A * | 10/2017 |

OTHER PUBLICATIONS

Indian Office Action issued on Oct. 29, 2021 for the corresponding Indian Patent Application No. 202117020233 (5 pages).

Chinese Office Action issued on May 30, 2022 for the corresponding Chinese Patent Application No. 201980066336.9 and an English (23 pages).

Canadian Office Action issued on Jun. 13, 2022 for the corresponding Canadian Patent Application No. 3115748 (3 pages).

* cited by examiner (1) EXAMPLE OF LAMINATED STATE a (2) EXAMPLE OF LAMINATED STATE b (A)  (B)

PRODUCTION METHOD OF POLYPROPYLENE SHEET

TECHNICAL FIELD

The present invention relates to a method for producing a polypropylene sheet.

BACKGROUND ART

Oriented polypropylene films are used in the fields that require excellent transparency and mechanical properties as well as high heat-resistance. Oriented polypropylene films have a thin thickness of less than 150 µm, and the application thereof is limited. Thus, when the thickness of the oriented film is increased, expansion of their use to another application can be expected. For example, Patent Literature 1 discloses that a sheet with a predetermined thickness or more can be produced by laminating and thermally sealing a plurality of uniaxially oriented polypropylene films. Further, Patent Literature 2 discloses that a polypropylene sheet having an excellent transparency and mechanical properties can be provided by laminating and thermally sealing a plurality of biaxially oriented polypropylene films having specific higher-order structure parameters.

CITATION LIST

Patent Literature

Patent Literature 1: JP 2012-96526 A
Patent Literature 2: JP 2017-186561 A

SUMMARY OF INVENTION

Technical Problem

Unfortunately, in the case where high speed forming is performed in order to produce the sheet descried in the Patent Literatures with high production rate, thermal sealing between uniaxially oriented polypropylene films or biaxially oriented polypropylene films has not been sufficient. Accordingly, there is a demand for application of the polypropylene sheet to the field that requires higher mechanical properties. In view of the above circumstances, an object of the present invention is to provide a method for producing a polypropylene sheet having excellent transparency and mechanical properties with high production rate.

Solution to Problem

The present inventors found that the above-described problems can be solved by alternately laminating biaxially oriented polypropylene films having a specific melting point and thermally sealing layers of the films, and thus completed the present invention. That is, the above-described problems can be solved by the present invention below.

[1] A method for producing a polypropylene sheet having a thickness of 0.5 to 5 mm, the method comprising;
a step 1 of preparing a precursor in which a first biaxially oriented polypropylene film having a thickness of less than 0.15 mm and a melting point Tmh and a second biaxially oriented polypropylene film having a thickness of less than 0.15 mm and a melting point of Tml are alternately laminated; and
a step 2 of bringing a heating element into contact with an outermost layer of the precursor to thermally seal layers of the film, in which $$Tmh-Tml \geq 8(°C.)$$

where the melting point is measured by a differential scanning calorimeter (DSC) under the condition at 30° C. to 230° C. and a heating rate of 10° C./min.

[2] The method for producing the sheet according to [1], in which a melting point $Tm_{out}$ of the outermost layer and a temperature T of the heating element satisfies the following condition:

$$Tm_{out}-T \geq 4(°C.).$$

[3] The production method according to [1] or [2], in which the step 2 is carried out using a heating roll as a heating element.
[4] The production method according to any of [1] to [3], in which, in the polypropylene sheet, a ratio Dh/Dl is 1 to 30 where Dh is a thickness of a layer attributed to the first biaxially oriented polypropylene film, and Dl is a thickness of a layer attributed to the second biaxially oriented polypropylene film.
[5] The production method according to any of [1] to [4], in which, in the polypropylene sheet, in an integrated intensity $I_x^V$ at an azimuth angle determined from a small angle X-ray scattering two-dimensional profile obtained by allowing an X-ray (wavelength: 0.154 nm) to be incident in the X direction, a scattering peak is observed in a range of 2θ=0.2° to 1.0°.
[6] The production method according to any of [1] to [5], in which the step 1 comprises a step of coextruding a raw material of the first biaxially oriented polypropylene film and a raw material of the second biaxially oriented polypropylene film to prepare an original sheet having a plurality of layers, and biaxially stretching the original sheet to prepare the precursor.
[7] The method for producing a formed article, the method comprising preparing a polypropylene sheet by the method according to any of [1] to [6], and forming the polypropylene sheet into the formed article.

Advantageous Effects of Invention

According to the present invention, a method for producing a polypropylene sheet having an excellent transparency and mechanical properties can be provided with high production rate.

DESCRIPTION OF EMBODIMENTS

Figure 1:
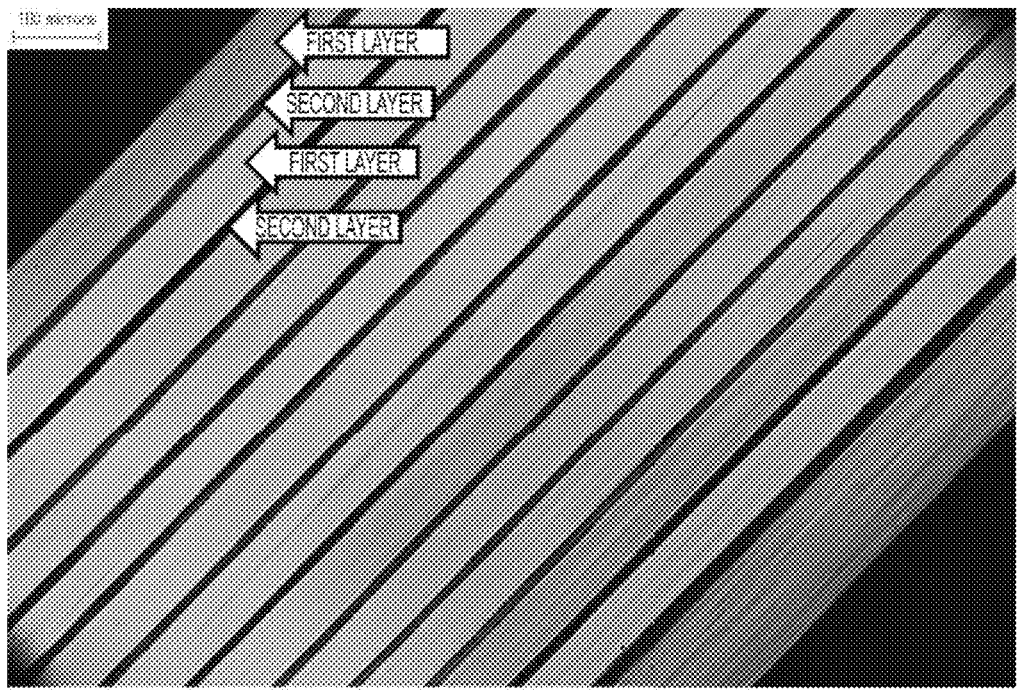
FIG. 1 illustrates an explanatory view of the cross-sectional structure of a sheet obtained by laminating and thermally sealing a biaxially oriented polypropylene film.
Figure 1:
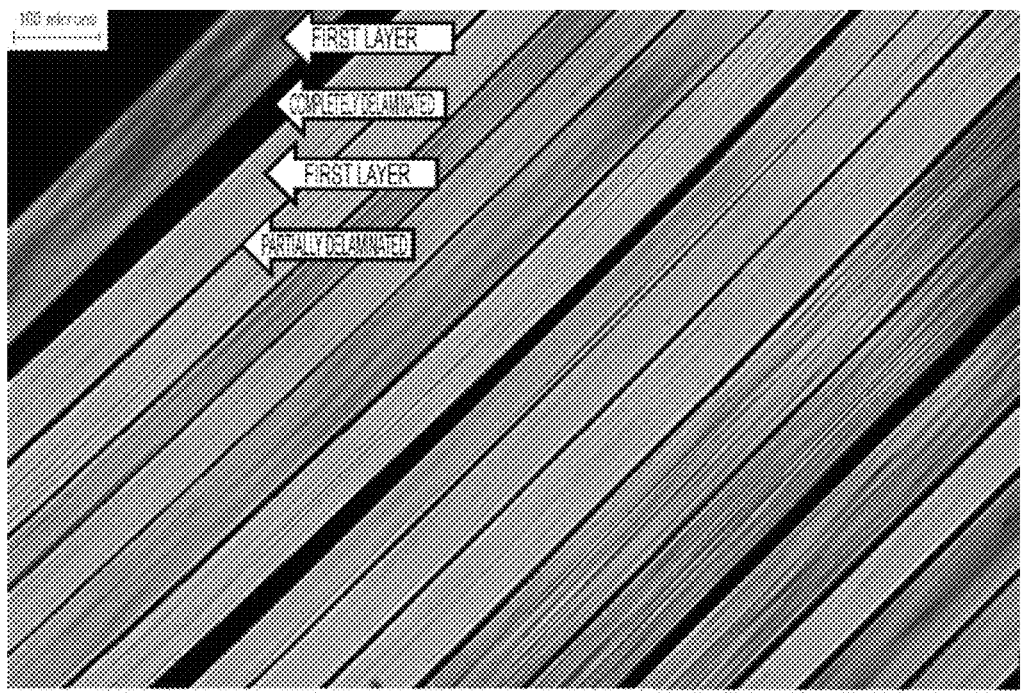

Hereinafter, the present invention will be described in detail. In the present invention, "X to Y" includes its end values, that is, X and Y. In the present invention, the sheet refers to a film-like part having a thickness of 150 μm or more, and the film refers to a film-like part having a thickness of less than 150 μm.

1. Production Method

The method for producing the sheet of the present invention includes: a step 1 of preparing a precursor in which a first biaxially oriented polypropylene film having a thickness of less than 0.15 mm and a melting point Tmh and a second biaxially oriented polypropylene film having a thickness of less than 0.15 mm and a melting point of Tml are alternately laminated; and a step 2 of bringing a heating element into contact with an outermost layer of the precursor to thermally seal layers of the films. These melting points satisfy Tmh−Tml 8(° C.). A difference between the melting points in this range results in favorable adhesion between layers. From this point of view, the difference of the melting point is preferably 10 (° C.) or higher. The upper limit of difference in the melting point is not limited, but is preferably 40(° C.) or lower from the viewpoint of polypropylene production. Hereinafter, respective steps will be described.

(1) Step 1

In this step, a precursor is prepared in which a first biaxially oriented polypropylene film and a second biaxially oriented polypropylene film are alternately laminated. The precursor includes a plurality of the films, and thus there is a plurality of interfaces between layers. All of the interfaces do not need to be sealed, but one or some of the interfaces may be sealed. For example, in the case where one sheet of the first biaxially oriented polypropylene film and one sheet of the second biaxially oriented polypropylene film are laminated, all the layers in the precursor are preferably not sealed. Further, as described later, in the case of using a coextruded film of the first biaxially oriented polypropylene film and the second biaxially oriented polypropylene film, one or some of the interfaces in the precursor are sealed.

This step can be implemented by separately preparing the first biaxially oriented polypropylene film (for convenience, hereinafter also referred to as "F1") and the second biaxially oriented polypropylene film (for convenience, hereinafter also referred to as "F2"), and by alternately laminating these films. For example, the precursor can be prepared by laminating F1/F2/F1/F2/F1. In this case, one or some of the interfaces among all layers are preferably not sealed. Both outermost layers are preferably F1 from the viewpoint of enhancing the heat-resistance of the resulting sheet.

A biaxially oriented film having a thickness of less than 0.15 mm can be obtained by biaxially stretching polypropylene or a composition containing the polypropylene and an additive by a publicly known method. For example, a biaxially oriented film can be obtained by extruding or press molding the polypropylene or the like into an un-oriented sheet, and then biaxially stretching the sheet. The thickness of the film is not limited as long as the thickness is less than 0.15 mm, and the thickness is preferably 0.12 mm or less, and more preferably 0.10 mm or less from the viewpoint of ease of handling or the like. The lower limit of the thickness is not limited, but is preferably 0.01 mm or more, and more preferably 0.03 mm or more.

This step can also be implemented by using a coextruded film of F1 and F2. A film having such a configuration allows the step 2 to be simplified. Specifically, a precursor in which F1 and F2 are alternately laminated can be prepared by coextruding a raw material of F1 and a raw material of F2 to prepare an original sheet having a plurality of layers and biaxially stretching the original sheet. In this case, the number of layers of the precursor is not limited, but is preferably two or three. For example, a coextruded biaxially oriented film including two layers of F1/F2, or a coextruded biaxially oriented film including three layers of F2/F1/F2 is prepared, and a desired number of the films can be layered. As an example, when a two-layer original sheet of F1/F2 is denoted as [F1/F2], the following precursor can be prepared.

[F1/F2]/[F1/F2]/[F1/F2]/F1

In the precursor, the coextruded film and the other coextruded film, and the coextruded film and the other monolayer film are not sealed. The raw material of F1 is a material that can form F1, and may be any shape of a film, sheet, pellet, and powder. The same applies to the raw material of F2. The precursor may include the case where materials of F1 or materials of F2 are integrated by thermal sealing in the step 2 described later to finally form a structure in which F1 and F2 are alternately laminated. For example, the following precursor may be prepared.

F1/[F2/F1/F2]/[F2/F1/F2]/F1

Respective films can be disposed in any direction. The orientation direction in-plane of the sheet can be adjusted depending on the disposition of the films. The number of films to be laminated is appropriately adjusted as described above. Details of the polypropylene and the additive will be described later.

(2) Step 2

In this step, a heating element is brought into contact with the outermost layers of the precursor to thermally seal the respective layers. The melting point $Tm_{out}$ of the outermost layer and the temperature T of the heating element preferably satisfies the relationship $Tm_{out}-T \geq 4(° C.)$. By satisfying the relationship, the layers can be favorably sealed. The temperature difference is more preferably 6° C. or higher from this point of view. The upper limit of the temperature difference is not limited, but is preferably 40° C. or lower from the viewpoint of polypropylene production. T can be measured by any method, but is preferably measured by using a non-contact type thermometer such as a radiation thermometer. $Tm_{out}$ corresponds to the melting point of a monolayer film disposed as the outermost layer. The melting point is defined as the peak temperature of the melting curve obtained through measurement by DSC under the conditions from 30° C. to 230° C. and a heating rate of 10° C./min. The temperature of the heating element is preferably approximately 120 to 190° C., more preferably 140 to 170° C., and even more preferably 150 to 165° C., but is not limited thereto.

Preferably, this step is successively performed using a heating roll as the heating element. Specifically, the layers are sealed by passing the precursor between two heated rolls. A heating roll combining two or more pairs of rolls, each pair being composed of two rolls, is used as a heating element for sealing. The pressure to be applied at that time is appropriately adjusted. The take-up speed in the roll forming is not limited, but is preferably approximately 0.05 to 10 m/min.

Examples of the method other than the roll forming include press-bond molding and seal molding. In addition, in the thermally sealing the films, a pressure is preferably applied in order to suppress thermal shrinkage and further promote orientation. The pressure at that time is appropriately adjusted according to the sealing temperature.

(3) Other Steps

The production method of the present invention may further include a publicly known step such as cooling the sheet obtained in the preceding step. Non-limiting examples of the cooling method include a method of cooling at room temperature or a method of cold-pressing at room temperature or at 10 to 20° C.

The sheet obtained by the production method of the present invention exhibits favorable adhesion between films, and has almost no discontinuity between layers. Thus, the sheet obtained by the production method of the present invention can be dealt as an integrated sheet. In the conventional method, provision of a biaxially oriented sheet having a thickness of 0.5 mm or more has not been industrially realized in view of costs or the like. However, a sheet that has a thickness of 0.5 mm or more and has orientations of two or more directions can be industrially produced by the present invention.

By performing secondary molding (including forming into a desired shape) on the sheet obtained by the production method of the present invention, by the method according to the purpose, various formed articles can be obtained. Examples of the secondary molding method include known press molding, hot plate molding, stretch molding, roll forming, drawing molding, press-bond molding, seal molding, vacuum forming, pressure forming, and vacuum-pressure forming. Further, a special film can be bonded to the outermost surface of the sheet obtained by the production method of the present invention for the purpose of decoration and surface modification. Examples of the film to be bonded include anti-fogging films, low temperature sealing films, adhesive films, printed films, embossed films, and films for retort packaging. The thickness of the film of the outermost surface is not particularly limited, but an excessive thickness of the film may result in deterioration of the properties of the sheet obtained by the present invention. Further, special films generally require high cost and are not preferred in economical view. Thus, the film thickness is preferably thin. In the step of thermally sealing biaxially oriented polypropylene films to laminate the films, a special film can be laminated on the surface of the film disposed in the outermost layer.

In addition, a coated sheet having a coating film on the sheet can also be obtained by applying coating to the sheet obtained by the production method of the present invention. The type of coating film is not limited, and is not normally limited as long as the coating film is used in the coating field. However, in the present invention, coating films used for coating automobile bodies are preferred. Examples of the preferred coating film include epoxy-based coating films, urethane-based coating films, and polyester-based coating films. A lower layer coating film (primer coating film), a middle layer coating film, an upper layer coating film (clear coating film) may be provided as necessary. In the case where the sheet obtained by the production method of the present invention is used as a sheet to be coated (coating sheet), the surface to be coated preferably has a functional group.

(4) Application of Functional Group

The method for applying a functional group to the surface of the sheet obtained by the production method of the present invention is not limited. For example, an oxygen-containing functional group can be applied to the surface by subjecting the sheet obtained by the production method of the present invention to plasma treatment or corona treatment. Alternatively, a functional group can be applied by preparing a polypropylene film having a functional group, and laminating the functional group-containing film with the above-described films in the lamination step so that the functional group-containing film is the outermost layer. Here, the latter method will be described.

A polypropylene film having an oxygen-containing functional group can be obtained by forming a publicly known polypropylene such as maleic anhydride-modified polypropylene or epoxy-modified polypropylene into a film. The thickness of the functional group-containing film is not limited, but is preferably less than 150 μm. Moreover, the functional group-containing film may or may not be biaxially oriented. In the lamination step, a polypropylene film having a functional group and a polypropylene film having no functional group may be simultaneously laminated, or polypropylene films having no functional group are laminated to produce a sheet in advance, and then a polypropylene film having a functional group may be laminated on the surface of the sheet. However, the simultaneous lamination method is preferred in consideration of workability.

2. Polypropylene Sheet

Hereinafter, the polypropylene sheet obtained by the production method of the present invention will be described.

(1) Thickness

The polypropylene sheet obtained by the production method of the present invention (sheet obtained by the production method of the present invention) has a thickness of 0.5 to 5 mm. The thickness may be appropriately adjusted according to the application, and, for example, may be 0.7 mm or more, or 1 mm or more. The thickness may be 3 mm or less, or 1 mm or less.

(2) Multilayer Structure

The sheet obtained by the production method of the present invention has a multilayer structure in which a first layer having a high melting point Tmh and a second layer having a low melting point Tml are alternately laminated. Since the respective layers are sealed, the sheet obtained by the production method of the present invention is an integrated sheet. Specifically, it can be confirmed, by the cross-sectional observation with a polarization optical microscope as illustrated in FIG. 1, whether respective layers of the sheet are sealed to be integrated or delaminated by application of slight force due to insufficient sealing. FIG. 1(1) illustrates a state where the first layers and the second layers are favorably sealed. FIG. 1(2) illustrates a state where interfaces of the layers of the sheet comprising a plurality of the first layers are completely delaminated, partially delaminated, or favorably sealed.

For the ratio Dh/Dl of the thickness Dh of the first layer to the thickness Dl of the second layer, a smaller value of the ratio indicates excellent sealing properties between the layers, and a lager value of the ratio indicates excellent rigidity of the resulting sheet. For the balance of sealing properties and rigidity, the ratio Dh/Dl is preferably 1 to 30, more preferably 1 to 25, and even more preferably 4 to 25.

The number of the layers depends on the thickness of the monolayer film, but a preferred aspect is one in which a total (the first layers and second layers) of approximately 15 to 100 layers, each layer having a thickness of approximately 0.01 to 0.1 mm, exist. At that time, both outermost layers are preferably the first layer having a high melting point.

These melting points can be measured by DSC under the conditions from 30° C. to 230° C. and a heating rate of 10°

C./min. The range of Tmh and Tml is not limited, but a preferred aspect is one in which Tmh is 160 to 180° C. and Tml is 130 to 150° C.

Figure 2:
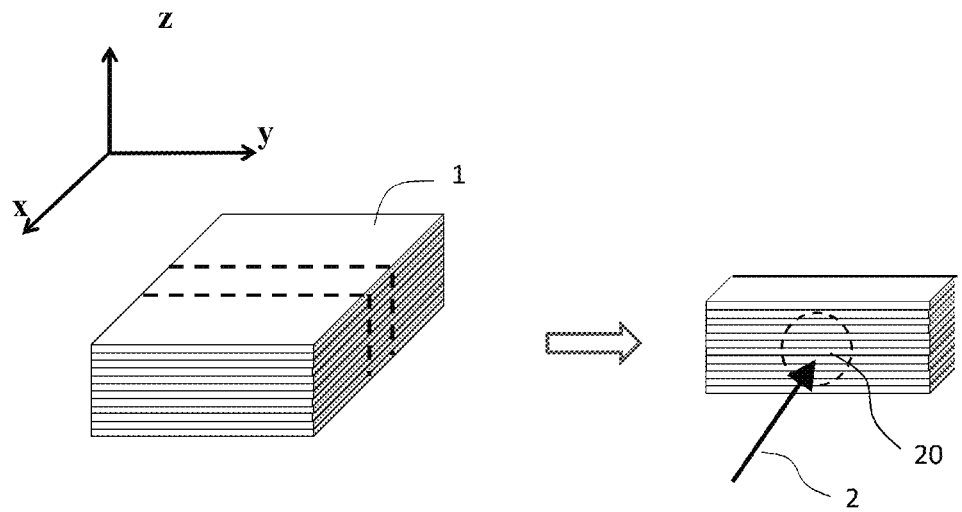
FIG. 2 illustrates a view for describing the measurement method of integrated intensities $I_x^V$ and $I_x^L$ in an azimuth angle.
Figure 3:
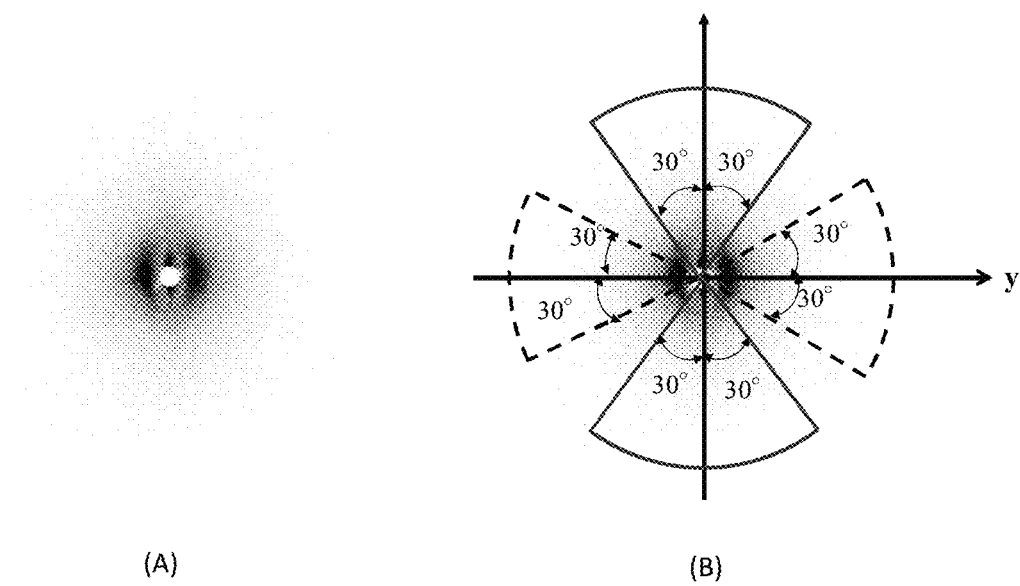
FIG. 3 illustrates a view for describing the analysis method of integrated intensities $I_x^V$ and $I_x^L$ in an azimuth angle.

In the sheet obtained by the production method of the present invention, in the integrated intensity $I_x^V$ in an azimuth angle of scattering in the meridian (Z) direction in a small angle X-ray two-dimensional profile as measured by allowing an X-ray (wavelength: 0.154 nm) to be incident from the X direction, the scattering peak is preferably observed in a range of 2θ=0.2° to 1.0°. Specifically, as illustrated in FIG. 2, a sample for integrated intensity measurement is cut out from the sheet obtained by the production method of the present invention, and an X-ray is incident to the sample from the X direction. FIG. 2 illustrates the sheet obtained by laminating a plurality of films. As a result, the two-dimensional profile of small angle X-ray scattering as illustrated in FIG. 3(A) can be obtained. Then, as illustrated in FIG. 3 (B), the integrated intensity $I_x^V$ is determined by integrating the intensities in the region ±30° with respect to the meridian, and the integrated intensity $I_x^L$ is determined by integrating the intensities in the region ±30° with respect to the equator.

The scattering peak in the equatorial direction is originated from crystal lamellas regularly arranged in the in-plane direction of the sheet. When the regularly arranged crystal lamellas exist, the scattering intensity in the equatorial direction increases. Meanwhile, the streak in the meridian direction is originated from the reflection at the surface of gaps remaining between the layers of the biaxially oriented films laminated mainly in the Z direction. Thus, when the oriented crystallites of the biaxially oriented film is maintained or increased in the sheet, $I_x^L$ becomes large. Meanwhile, when sealing between layers of the biaxially oriented film is sufficient, the surface of gaps remaining between the layers decreases, resulting in decrease in the streak of $I_x^V$. Thus, when $I_x^L$ is large and $I_x^V$ is small, the transparency and mechanical properties of the sheet are enhanced. In the α-crystal of polypropylene, when crystallization proceeds in a state in which crystal lamellas (parent lamellas) exist, lamellas with a small size (daughter lamellas) are grown in a direction substantially vertical to the parent lamellas. The scattering peak for long period originated from the daughter lamella is observed as $I_x^V$.

Figure 4:
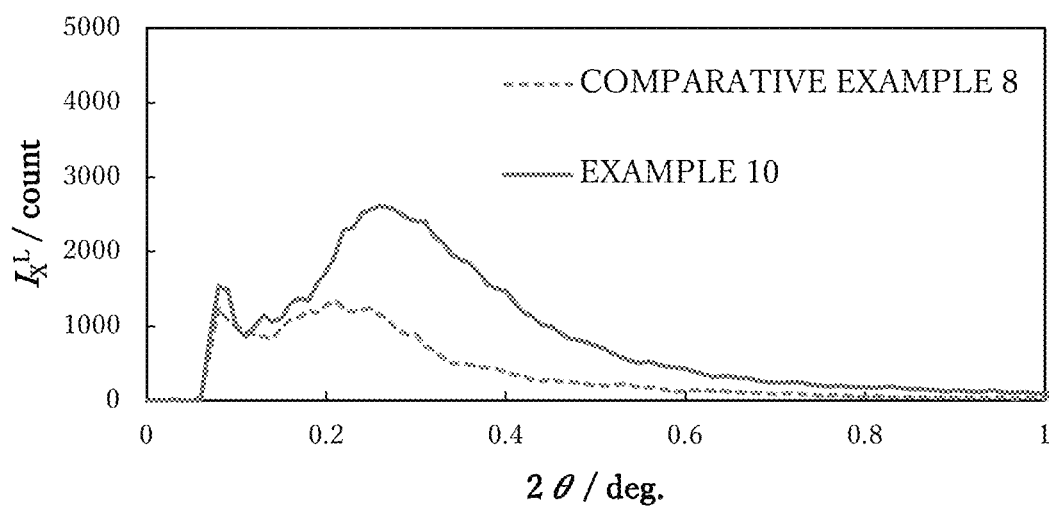
FIG. 4 illustrates the relationship between the integrated intensity $I_x^L$ (corresponding to the equatorial (Y) direction and normalized per pixel) in an azimuth angle of the small angle X-ray scattering two-dimensional profile and 2θ in Example 10 and Comparative Example 8.

FIG. 4 illustrates the relationship between the integrated intensity $I_x^L$ in an azimuth angle of the small angle X-ray scattering two-dimensional profile and 2θ in Example 10 and Comparative Example 8. It is found that, in the sheet of Example 10 which satisfies $Tm_{out}-T≥4(° C.)$, more amount of arranged crystal lamellas (parent lamellas) exist compared to the sheet of Comparative Example 8 which does not satisfy $Tm_{out}-T≥4(° C.)$.

Figure 5:
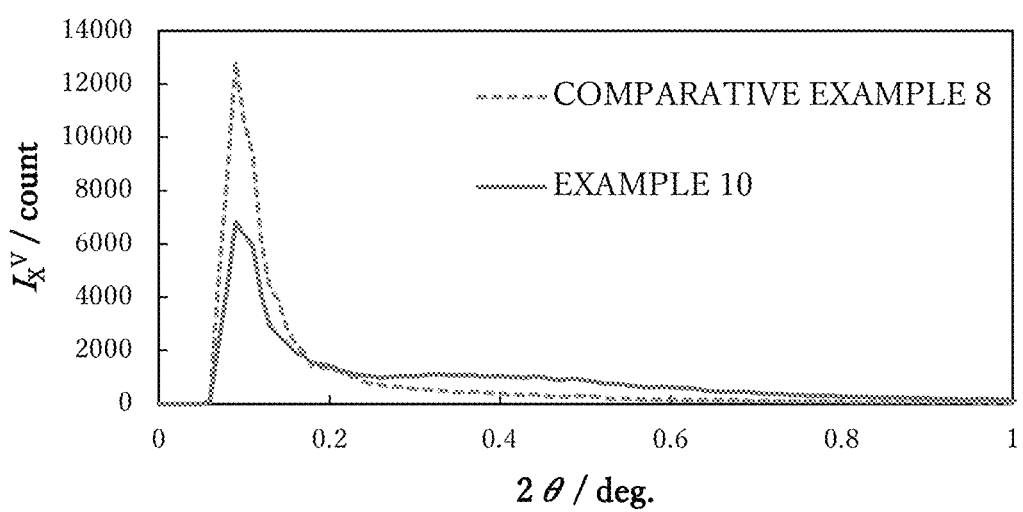
FIG. 5 illustrates the relationship between the integrated intensity $I_x^V$ (corresponding to the meridian (Z) direction and normalized per pixel) in an azimuth angle of the small angle X-ray scattering two-dimensional profile and 2θ in Example 10 and Comparative Example 8.

FIG. 5 illustrates the relationship between the integrated intensity $I_x^V$ in an azimuth angle of the small angle X-ray scattering two-dimensional profile and 2θ in Example 10 and Comparative Example 8. In the sheet of Example 10 which satisfies $Tm_{out}-T≥4(° C.)$, a broad scattering peak is observed in a range of 2θ=0.2° to 1.0°. The broad scattering peak is originated from daughter lamellas which do not exist in the sheet of Comparative Example 8 which does not satisfy $Tm_{out}-T≥4(° C.)$. The peak suggests that crystallization has proceeded in a state in which crystal lamellas (parent lamellas) exist. This proceeding of crystallization further enhances mechanical properties.

(3) Mechanical Properties

The sheet obtained by the production method of the present invention has excellent mechanical properties. For example, the sheet obtained by the production method of the present invention has a tensile modulus (JIS K7161-2) of 2,500 MPa or more. Further, the sheet obtained by the production method of the present invention has excellent cold impact resistance. For example, the sheet obtained by the production method of the present invention has a in-plane impact strength (−30° C., JIS K7211-2) of 5 J or more.

(4) Transparency

The sheet obtained by the production method of the present invention has excellent transparency. For example, the sheet obtained by the production method of the present invention has a total haze (ISO 14782) of 25% or less. A smaller value of the total haze of the sheet indicates excellent transparency, and the value is preferably 20% or less.

(5) Surface

A functional group can be applied to the surface of the sheet obtained by the production method of the present invention as described above. As the functional group, an oxygen-containing functional group is preferred. Examples of the oxygen-containing functional group include a carboxyl group, a carboxylate group, an acid anhydride group, a hydroxy group, an aldehyde group, and an epoxy group. These functional groups enhance adhesion between the sheet obtained by the production method of the present invention and other materials. In particular, a material, in which coating has been applied to the sheet having the functional group obtained by the production method of the present invention, has excellent gasohol resistance, which is resistance to alcohol-mixed gasoline. Among the functional groups, an acid anhydride group is preferable from this point of view. The functional group has only to exist on any surface of the sheet obtained by the production method of the present invention, but preferably exists on one surface or both surfaces of the main surface. The method for applying the functional group is as described above.

(6) Polypropylene

In the present invention, polypropylene refers to a polymer containing polypropylene as a main component. Polypropylene used for the first layer of the sheet obtained by the production method of the present invention is preferably propylene homopolymers (HOMO) or propylene random copolymers (RACO) containing 5.0 wt % or less of at least one of ethylene and C4 to C10 α-olefins as a comonomer. HOMOs or RACOs with a small content of comonomer are particularly preferable for excellent rigidity and transparency. Polypropylene used for the second layer of the sheet obtained by the production method of the present invention is preferably RACOs containing 15 wt % or less of at least one of ethylene and C4 to C10 α-olefins as a comonomer. RACOs with a large content of comonomer are particularly preferable for excellent adhesion between the first layer after sealing.

These polypropylenes can be produced in accordance with a publicly known method. In general, examples of known polymerization catalysts for polypropylene include: catalysts containing (A) solid catalysts containing magnesium, titanium, halogen, and electron-donating compounds; (B) organic aluminum compounds; and (C) external electron-donating compounds and metallocene catalysts. Any of the catalysts can be used for the production of the polypropylene of the present invention. Examples of the electron-donating compound in the component (A) (also referred to as "internal electron-donating compound") include phthalate-based compounds, succinate-based compounds, and diether-based compounds, and any of the internal electron-donating compounds can be used in the present invention. However, from the view point of providing the resulting polypropylene having a wide molecular weight distribution and exhibiting favorable biaxial stretchability, a catalyst containing a succinate-based compound as an internal electron-donating compound is preferable.

(7) Additive

The sheet obtained by the production method of the present invention may also contain a nucleating agent. The amount of the nucleating agent is greater than 0 part by weight and 1.0 parts by weight or less, and preferably 0.05 to 0.5 parts by weight, per 100 parts by weight of polypropylene. The nucleating agent refers to an additive (nucleating agent for transparency) used for controlling the size of crystalline components in resin to small to thereby enhance transparency. The nucleating agent is not particularly limited, and one typically used in this field can be used. The nucleating agent is preferably selected from nonitol-based nucleating agents, sorbitol-based nucleating agents, phosphate ester-based nucleating agents, triaminobenzene derivative nucleating agents, metal carboxylate nucleating agents, and xylitol-based nucleating agents. Examples of the nonitol-based nucleating agent include 1,2,3-trideoxy-4,6:5,7-bis-[(4-propylphenyl)methylene]-nonitol. Examples of the sorbitol-based nucleating agent include 1,3:2,4-bis-o-(3,4-dimethylbenzylidene)-D-sorbitol. Examples of the phosphoric acid ester-based nucleating agent include lithium 2,2'-methylenebis(4,6-di-tert-butylphenyl)phosphate-based nucleating agents.

The sheet obtained by the production method of the present invention may further contain commonly used additives that are normally used for polyolefins, such as anti-oxidants, chlorine absorbers, heat-resistant stabilizers, light stabilizers, ultraviolet absorbers, internal lubricants, external lubricants, anti-blocking agents, anti-static agents, anti-fogging agents, flame retardants, dispersants, copper corrosion inhibitors, neutralizing agents, plasticizers, crosslinking agents, peroxides, and extension oils, and other organic and inorganic pigments. The amount of the additive to be added may be a publicly known amount. Further, the sheet obtained by the production method of the present invention may also contain synthetic resins or synthetic rubbers other than polypropylene, as long as the effect of the present invention is not impaired. One type of synthetic resin or synthetic rubber may be used, or two or more types thereof may be used.

3. Application

The sheet obtained by the production method of the present invention has a high degree of orientation in an in-plane direction and specific higher-order structure parameters as well as exhibits less dependency of the degree of orientation in the thickness direction. Thus, the sheet obtained by the production method of the present invention has excellent mechanical properties while being light weight as polypropylene. Moreover, the sheet obtained by the production method of the present invention has excellent transparency. Thus, the sheet obtained by the production method of the present invention can be suitably used for food containers, lids, sundries, household electric appliances, daily necessities, and the like. Further, by laminating, and pressing or sealing a plurality of the sheets obtained by the production method of the present invention, a thicker sheet or a large formed article can also be obtained while orientation or the like is maintained. Thus, the sheet obtained by the production method of the present invention is also useful as, for example, automobile parts, electrical/electronic parts, housing parts, toy parts, furniture parts, building parts, industrial materials, distribution materials, and agricultural materials.

EXAMPLES

1. Preparation of Biaxially Oriented Film

Respective biaxially oriented films shown in Table 1 were prepared as follows.

[Biaxially Oriented Film A]

A solid catalyst component (1) was prepared in accordance with the preparation method described in Examples of JP 2011-500907 A. Specifically, the preparation is as follows.

In a 500 mL four-neck round bottom flask purged with nitrogen, 250 mL of $TiCl_4$ was introduced at 0° C. Then, 10.0 g of $MgCl_2 \cdot 1.8C_2H_5OH$ microspheres (produced in accordance with the method described in Example 2 of U.S. Pat. No. 4,399,054 A, but changed from operation at 10,000 rpm to operation at 3,000 rpm) and 9.1 mmol of diethyl-2,3-(diisopropyl)succinate were added with stirring. The temperature was raised to 100° C. and maintained for 120 minutes. Next, the stirring was stopped, the solid product was allowed to precipitate, and the supernatant was sucked out. Then, the following operation was repeated twice: 250 mL of new $TiCl_4$ was added; the mixture was allowed to react at 120° C. for 60 minutes; and the supernatant was sucked out. The resulting solid was washed six times at 60° C. with anhydrous hexane (6×100 mL) to obtain a solid catalyst (1).

The solid catalyst (1) obtained as described above, triethylaluminium (TEAL), and diisopropyldimethoxysilane (DIPMS) were brought into contact at 12° C. for 24 minutes in an amount such that the weight ratio of TEAL to the solid catalyst (1) was 11 and the weight ratio of TEAL to DIPMS was 3. The obtained catalyst system was maintained in a liquid propylene in the form of suspension at 20° C. for 5 minutes to carry out prepolymerization, and the resultant was used as a prepolymerization catalyst (S). The prepolymerization catalyst (S) was introduced into a polymerization reactor, and propylene as a monomer was supplied to the reactor. Further, a small amount of ethylene and hydrogen as a molecular weight modifier were supplied so that the ethylene concentration in the polymerization reactor was 0.118 mol % and the hydrogen concentration was 700 molppm. A propylene-ethylene copolymer was synthesized by adjusting the polymerization temperature to 70° C., and the polymerization pressure to 3.0 MPa. To 100 parts by weight of the obtained polymer, 0.2 parts by weight of an antioxidant (B225, available from BASF) and 0.05 parts by weight of a neutralizing agent (calcium stearate, available from Tannan Kagaku Kogyo Co. Ltd.) were blended, and this was mixed with stirring using a Henschel mixer for 1 minute. The mixture was melt-kneaded using a single-screw extruder (NVC φ50 mm, available from Nakatani Machinery Ltd.) at a cylinder temperature of 230° C., and the extruded strand was cooled in water, followed by cutting with a pelletizer to obtain a polymer composition (a) in the form of pellet. The ethylene content of the polymer composition (a) was 0.5 wt %, and the MFR (temperature: 230° C., load: 2.16 kg) was 3.0 g/10 min.

Using a three-type three-layer film/sheet forming machine (25 mm φ, available from TPIC Co., Ltd.), an original sheet having a thickness of 1.25 mm (size: 10 cm×10 cm or more) was obtained from the polymer composition (a) at a extruding temperature of 230° C. Then, the original sheet was subjected to simultaneous biaxial stretching (5 times×5 times) using a film stretching apparatus (KARO-IV, available from Bruckner) to obtain a biaxially oriented film A having a thickness of 50 μm.

[Biaxially Oriented Film B]

A solid catalyst (2) was prepared by the method described in Example 1 of EP 674991 B. The solid catalyst was a catalyst in which Ti and diisobutyl phthalate as an internal donner were supported on $MgCl_2$ by the method described in the above patent publication. The solid catalyst (2) obtained as described above, TEAL, and dicyclopentyldimethoxysilane (DCPMS) were brought into contact at −5° C. for 5 minutes in an amount such that the weight ratio of TEAL to the solid catalyst was 11 and the weight ratio of TEAL to DCPMS was 3. The obtained catalyst system was maintained in a liquid propylene in the form of suspension at 20° C. for 5 minutes to carry out prepolymerization. The obtained prepolymerization product was introduced into the polymerization reactor, and then hydrogen, propylene and ethylene were fed to the reactor. Then, a propylene-ethylene copolymer was obtained by adjusting the polymerization temperature to 75° C., the hydrogen concentration to 0.44 mol %, the ethylene concentration to 1.07 mol %, and the polymerization pressure. To 100 parts by weight of the obtained polymer, 0.2 parts by weight of an antioxidant (B225, available from BASF) and 0.05 parts by weight of a neutralizing agent (calcium stearate, available from Tannan Kagaku Kogyo Co. Ltd.) were blended, and this was mixed with stirring using a Henschel mixer for 1 minute. The mixture was melt-kneaded using a single-screw extruder (NVC φ50 mm, available from Nakatani Machinery Ltd) at a cylinder temperature of 230° C., and the extruded strand was cooled in water, followed by cutting with a pelletizer to obtain a polymer composition (b) in the form of pellet. The polymer composition (b) contained 4.0 wt % of ethylene-derived unit, and the MFR (temperature: 230° C., load: 2.16 kg) was 7.5 g/10 min.

Using a three-type three-layer film/sheet forming machine (25 mm φ, available from TPIC Co., Ltd.), an original sheet having a thickness of 1.25 mm (size: 10 cm×10 cm or more) was obtained from the polymer composition (b) at a extruding temperature of 230° C. The original sheet was subjected to simultaneous biaxial stretching (5 times×5 times) using a film stretching apparatus (KARO-IV, available from Bruckner) to obtain a biaxially oriented film B having a thickness of 50 μm.

[Biaxially Oriented Film C]

As a polymer composition (c), a propylene-ethylene-butene-1 copolymer (RACO, propylene: 90 wt %, ethylene: 4 wt %, butene: 6 wt %, MFR at a temperature of 230° C. and a load of 2.16 kg: 5.5 g/10 min, density: 0.90 g/cm³) was used. Using a three-type three-layer film/sheet forming machine (25 mm φ, available from TPIC Co., Ltd.), an original sheet having a thickness of 1.25 mm (size: 10 cm×10 cm or more) was obtained from the polymer composition (c) at a extruding temperature of 230° C. The original sheet was subjected to simultaneous biaxial stretching (5 times×5 times) using a film stretching apparatus (KARO-IV, available from Bruckner) to obtain a biaxially oriented film C having a thickness of 50 μm.

[Biaxially Oriented Film D]

The solid catalyst component (2) used for the preparation of the biaxially oriented film B, TEAL, and cyclohexylmethyldimethoxysilane (CHMMS) were brought into contact at −5° C. for 5 minutes in an amount such that the weight ratio of TEAL to the solid catalyst was 8 and the weight ratio of TEAL to CHMMS was 6.5. The obtained catalyst system was maintained in a liquid propylene in the form of suspension at 20° C. for 5 minutes to carry out prepolymerization. The obtained prepolymerization product was introduced into the polymerization reactor, and then hydrogen, propylene and ethylene were fed to the reactor. Then, a propylene-ethylene copolymer was obtained by adjusting the polymerization temperature to 75° C., the hydrogen concentration to 0.03 mol %, the ethylene concentration to 0.13 mol %, and the polymerization pressure. To 100 parts by weight of the obtained polymer, 0.2 parts by weight of an antioxidant (B225, available from BASF) and 0.05 parts by weight of a neutralizing agent (calcium stearate, available from Tannan Kagaku Kogyo Co. Ltd.) were blended, and this was mixed with stirring using a Henschel mixer for 1 minute. The mixture was melt-kneaded using a single-screw extruder (NVC φ50 mm, available from Nakatani Machinery Ltd) at a cylinder temperature of 230° C., and the extruded strand was cooled in water, followed by cutting with a pelletizer to obtain a polymer composition (d) in the form of pellet. The polymer composition (d) contained 0.5 wt % of ethylene-derived unit, and the MFR (temperature: 230° C., load: 2.16 kg) was 2.5 g/10 min.

Using a three-type three-layer film/sheet forming machine (25 mm φ, available from TPIC Co., Ltd.), an original sheet having a thickness of 1.25 mm (size: 10 cm×10 cm or more) was obtained from the polymer composition (d) at a extruding temperature of 230° C. The original sheet was subjected to simultaneous biaxial stretching (5 times×5 times) using a film stretching apparatus (KARO-IV, available from Bruckner) to obtain a biaxially oriented film D having a thickness of 50 μm.

[Biaxially Oriented Film E]

A prepolymerization catalyst (S) same as that used for preparation of the biaxially oriented film A was introduced into the polymerization reactor to obtain a propylene homopolymer. During polymerization, the temperature and pressure were adjusted, and hydrogen was used as a molecular weight modifier. The polymerization temperature was 70° C., and the hydrogen concentration was 0.25 mol %. To 100 parts by weight of the obtained polymer, 0.2 parts by weight of an antioxidant (B225, available from BASF) and 0.05 parts by weight of a neutralizing agent (Calcium Stearate, available from Tannan Kagaku Kogyo Co. Ltd.) were blended, and this was mixed with stirring using a Henschel mixer for 1 minute. Then, the mixture was extruded using a single-screw extruder with a screw diameter of 50 mm (NVC, available from Nakatani Machinery Ltd) at a cylinder temperature of 230° C., and the strand was cooled in water, followed by cutting with a pelletizer to obtain a polymer composition (e) in the form of pellet. The content of ethylene-derived unit in the polymer composition (e) was 0 wt %, and the MFR (temperature: 230° C., load: 2.16 kg) was 10 g/10 min.

Using a three-type three-layer film/sheet forming machine (25 mm φ, available from TPIC Co., Ltd.), an original sheet having a thickness of 1.25 mm (size: 10 cm×10 cm or more) was obtained from the polymer composition (e) at a extruding temperature of 230° C. The original sheet was subjected to simultaneous biaxial stretching (5 times×5 times) using a film stretching apparatus (KARO-IV, available from Bruckner) to obtain a biaxially oriented film E having a thickness of 50 μm.

[Biaxially Oriented Film AB-1, and AB-2]

Using a three-type three-layer film/sheet forming machine (25 mm φ, available from TPIC Co., Ltd.), coextrusion was performed at a extruding temperature of 230° C. so as to form a structure of polymer composition (a)/polymer composition (b), and thus original sheets each having a thickness of 1.25 mm (size: 10 cm×10 cm or more) were obtained. The respective original sheets were subjected to simultaneous biaxial stretching (5 times×5 times) using a film stretching apparatus (KARO-IV, available from Bruckner) to obtain biaxially oriented films AB-1 and AB-2 each having a thickness of 50 μm. The thickness ratio of the polymer composition (a) to polymer composition (b) was 90/10 for the film AB-1 and 95/5 for the film AB-2.

[Biaxially Oriented Film AC, AD, DB, DC, EB-1, and EB-2]

Using a three-type three-layer film/sheet forming machine (25 mm φ, available from TPIC Co., Ltd.), coextrusion was performed at a extruding temperature of 230° C. so as to form structures of polymer composition (a)/polymer composition (c), polymer composition (a)/polymer composition (d), polymer composition (d)/polymer composition (b), polymer composition (d)/polymer composition (c), and polymer composition (e)/polymer composition (b), and thus original sheets each having a thickness of 1.25 mm (size: 10 cm×10 cm or more) were obtained. Respective original sheets were subjected to simultaneous biaxial stretching (5 times×5 times) using a film stretching apparatus (KARO-IV, available from Bruckner) to obtain biaxially oriented films AC, AD, DB, DC, EB-1, and EB-2 each having a thickness of 50 μm. The thickness ratio was 85/15 for EB-1, and 90/10 for AC, AD, DB, DC, and EB-2.

[Biaxially Oriented Film BAB]

Using a three-type three-layer film/sheet forming machine (25 mm φ, available from TPIC Co., Ltd.), coextrusion was performed at a extruding temperature of 230° C. so as to form a structure of polymer composition (b)/polymer composition (a)/polymer composition (b), and thus an original sheet having a thickness of 1.25 mm (size: 10 cm×10 cm or more) was obtained. The original sheet was subjected to simultaneous biaxial stretching (5 times×5 times) using a film stretching apparatus (KARO-IV, available from Bruckner) to obtain a biaxially oriented film BAB having a thickness of 50 μm. The thickness ratio was 10/80/10.

2. Production of Sheet

Example 1

First, 11 biaxially oriented films A and 10 biaxially oriented films B were alternately laminated to prepare a precursor in which both outermost layers are biaxially oriented films A. The respective layers of the precursor were thermally sealed using, as a heating element, a roll forming machine (induction heated jacket rolls, available from Tokuden Co., Ltd., model: JR-DO-W, roll diameter: 200 mmφ×2, length of roll surface: 410 mm), to produce a sheet. The forming condition was as shown in Table 2. Then, the sheet was evaluated by the method described below.

Example 2

A sheet was produced using a biaxially oriented film C instead of the biaxially oriented film B in the same manner as in Example 1, and the sheet was evaluated.

Example 3

10 biaxially oriented films AB were laminated and 1 biaxially oriented film A was then laminated thereon, thus preparing a precursor in which both outermost layers are biaxially oriented films A. A sheet was produced using the precursor in the same manner as in Example 1, and the sheet was evaluated.

Example 4

A sheet was produced in the same manner as in Example 3 except for changing the take-up speed for the heating roll forming, and the sheet was evaluated.

Example 5

A sheet was produced in the same manner as in Example 3 except for changing the number of biaxially oriented films to be laminated, the thickness of the sheet to 4 mm, and the heating roll temperature, and the sheet was evaluated.

Examples 6 to 11

Sheets were produced in the same manner as in Example 3 except for changing the biaxially oriented film to be laminated as shown in Table 2, and the sheets were evaluated.

Example 12

19 biaxially oriented films BAB and the total of two biaxially oriented films A for both ends were laminated to prepare a precursor in which both outermost layers are biaxially oriented films A. A sheet was produced using the precursor in the same manner as in Example 1, and the sheet was evaluated.

Comparative Example 1

A comparative sheet was produced using only the biaxially oriented film A in the same manner as in Example 1, and the sheet was evaluated.

Comparative Example 2

A comparative sheet was produced in the same manner as in Comparative Example 1 except for changing the heating roll temperature, and the sheet was evaluated.

Comparative Example 3

A precursor was prepared using only the biaxially oriented film B. A comparative sheet was produced using the precursor in the same manner as in Example 1, and the sheet was evaluated. Note that the heating roll temperature was as shown in Table 2.

Comparative Example 4

A comparative sheet was produced in the same manner as in Comparative Example 3 except for changing the heating roll temperature, and the sheet was evaluated.

Comparative Examples 5 to 7

Respective precursors were prepared using only the biaxially oriented film C, only the biaxially oriented film D, and only the biaxially oriented film E. The comparative sheets were produced using the precursors in the same manner as in Example 1, and the sheets were evaluated. Note that, for Comparative Example 5 (only C), the heating roll temperature was also changed.

Comparative Example 8

A comparative sheet was produced in the same manner as in Comparative Example 7 except for changing the heating roll temperature, and the sheet was evaluated.

Comparative Example 9

A comparative sheet was produced in the same manner as in Example 1 except for using the biaxially oriented film D instead of the biaxially oriented film B, and the sheet was evaluated.

Comparative Example 10

A comparative sheet was produced in the same manner as in Example 3 except for using the biaxially oriented film AD instead of the biaxially oriented film AB-1, and the sheet was evaluated.

Comparative Example 11

A comparative sheet was produced in the same manner as in Comparative Example 10 except for changing the heating roll temperature, and the sheet was evaluated.

3. Evaluation (1) MFR

MFR was measured in accordance with JIS K7210-1 under the conditions at a temperature of 230° C. and a load of 2.16 kg.

(2) The Amount of Ethylene-Derived Unit Contained in the Polymer Composition (Wt %)

A spectrum of $^{13}$C-NMR for the sample dissolved in a mixed solvent of 1,2,4-trichlorobenzene and deuterated benzene was obtained using AVANCE III HD400, available from Bruker ($^{13}$C resonance frequency: 100 MHz) under the conditions of measurement temperature: 120° C., flip angle: 45 degrees, pulse interval: 7 seconds, sample rotating speed: 20 Hz, and number of scans: 5000 times. The amount of ethylene-derived unit (wt %) contained in the polymer composition was determined using the obtained spectrum by the method described in the literature of M. Kakugo, Y. Naito, K. Mizunuma and T. Miytake, Macromolecules, 15, p. 1150 to 1152 (1982).

(3) $I_x^V$ and $I_x^L$

As illustrated in FIG. 2, an X-ray (wavelength: 0.154 nm) was incident to the sheet in the X direction, using an X-ray scattering device (MicroMax and NanoViewer, available from Rigaku Corporation) to perform small angle X-ray scattering measurement. The background was removed for the obtained two-dimensional profile, and then the integrated intensity $I_x^L$ at an azimuth angle in the equatorial (Y axis) direction and the integrated intensity $I_x^V$ at an azimuth angle in the meridian (Z axis) direction were determined. The region of the integration ranged from the equator (Y axis) and the meridian (Z axis) to ±30° in the azimuth angle.

In this analysis, to avoid an influence of the reflection at the sheet surface, the size of the X-ray incident beam at the sample irradiation position needs to be smaller than the thickness of the sheet. At this time, the beam size at the sample irradiation position was set to 700 μm for a 1 mm-thick sheet.

(4) Melting Point Measured by DSC (Tmh and Tml)

Approximately 5 mg of a sample taken from a biaxially oriented film was weighed with an electronic balance. Thereafter, the sample was maintained at 30° C. for 5 minutes and then heated to 230° C. at a heating rate of 10° C./min by the differential scanning calorimeter (DSC) (Q-200, available from TA Instruments) to obtain a melting curve. For the peak temperature of the melting curve, the melting point of the first biaxially oriented polypropylene film was defined as Tmh, and the melting point of the second biaxially oriented polypropylene film was defined as Tml. In the case where a plurality of melting point peaks were observed in each of the films, the temperature of the maximum peak was defined as the melting point. Note that the melting point of the outermost layer is defined as $Tm_{out}$, and $Tm_{out}$=Tmh or $Tm_{out}$=Tml. However, as an aspect in which a high melting point component is contact with a heating element, $Tm_{out}$=Tmh is preferred.

(5) Rigidity (Tensile Modulus)

The obtained sheet was formed into a type A2 multi-purpose test piece according to JIS K7139 was prepared through machine processing. Tensile modulus was measured in accordance with JIS K7161-2, using a precision universal testing machine (Autograph AG-X 10 kN), available from Shimadzu Corporation, under the conditions of a temperature of 23° C., a relative humidity of 50%, and a test speed of 1 mm/min.

(6) Cold Impact Resistance (in-Plane Impact Strength)

The puncture energy (J) for the obtained sheet was determined in accordance with JIS K7211-2 using Hydroshot HITS-P10, available from Shimadzu Corporation. In a chamber adjusted to −30° C., a test piece for measurement was placed on a support base having a hole with an inner diameter of 40 mmφ and secured with a sample holder with an inner diameter of 76 mmφ. Then, the test piece was struck with a striker having a diameter of 12.7 mmφ and having a hemispherical striking surface at an impact velocity of 1 m/sec. The average value of the puncture energies of four test pieces for measurement was taken as the in-plane impact strength.

(7) Transparency (Haze)

Haze measurement was performed on the obtained sheet in accordance with ISO 14782 using HM-150, available from Murakami Color Research Laboratory Co., ltd., to evaluate transparency. Further, to remove an influence of unevenness on the surface of the sheet derived from the forming and cooling condition, a liquid paraffin was applied to the surface of the sheet with a brush, and then haze measurement was performed in the same manner. The former was defined as "total haze," and the latter was defined as "internal haze." Further, to confirm the contribution of the sheet surface, "external haze" ("total haze"−"internal haze") was defined.

(8) Laminated State

The obtained sheet was sliced at the central portion in a direction vertical to the surface with a rotary microtome (model: RU-S), available from Nihon Microtome Laboratory Inc., to obtain a section with a thickness of 20 μm. This section was observed with a polarization optical microscope (BX-50), available from Olympus Corporation, under the crossed Nicol condition, and the laminated state was evaluated based on the following criteria.

a: there was no delamination between layers.

b: partially delaminated layers were observed.

c: layers were completely delaminated.

d: a multilayer structure could not be confirmed.

FIG. 1 illustrates an example of the laminated state a and the laminated state b. The dark portions in FIG. 1(1) are the second layers, and it is found that the first layers and the second layers are not delaminated. FIG. 1 (2) is a sheet constituted by a plurality of the first layers, and the deep dark portions indicate delamination.

TABLE 1

| | Biaxially oriented film | | | | | | | |
|---|---|---|---|---|---|---|---|---|
| | A Single layer extrusion (a) | B Single layer extrusion (b) | C Single layer extrusion (c) | D Single layer extrusion (d) | E Single layer extrusion (e) | AB-1 Two type-two layer coextrusion (a)/(b) | AB-2 Two type-two layer coextrusion (a)/(b) | AC Two type-two layer coextrusion (a)/(c) |
| Original sheet thickness (mm) | 1.25 | 1.25 | 1.25 | 1.25 | 1.25 | 1.25 | 1.25 | 1.25 |
| Thickness ratio (layer 1/layer 2/layer 1) | — | — | — | — | — | 90/10 | 95/5 | 90/10 |
| 5 × 5 Simultaneously biaxially oriented film thickness (mm) | 0.05 | 0.05 | 0.05 | 0.05 | 0.05 | 0.05 | 0.05 | 0.05 |
| Simultaneous biaxial stretching temperature (° C.) | 160 | 140 | 135 | 155 | 160 | 160 | 160 | 160 |
| Simultaneous biaxial stretching ratio | 5 × 5 | 5 × 5 | 5 × 5 | 5 × 5 | 5 × 5 | 5 × 5 | 5 × 5 | 5 × 5 |
| Tmh (° C.) | 169 | 140 | 137 | 163 | 170 | 169 | 169 | 169 |
| Tml (° C.) | 169 | 140 | 137 | 163 | 170 | 140 | 140 | 137 |
| Tmh − Tml (° C.) | 0 | 0 | 0 | 0 | 0 | 29 | 29 | 32 |

| | Biaxially oriented film | | | | | |
|---|---|---|---|---|---|---|
| | AD Two type-two layer coextrusion (a)/(d) | DB Two type-two layer coextrusion (d)/(b) | DC Two type-two layer coextrusion (d)/(c) | EB-1 Two type-two layer coextrusion (e)/(b) | EB-2 Two type-two layer coextrusion (e)/(b) | BAB Two type-three layer coextrusion (b)/(a)/(b) |
| Original sheet thickness (mm) | 1.25 | 1.25 | 1.25 | 1.25 | 1.25 | 1.25 |
| Thickness ratio (layer 1/layer 2/layer 1) | 90/10 | 90/10 | 90/10 | 85/15 | 90/10 | 10/80/10 |
| 5 × 5 Simultaneously biaxially oriented film thickness (mm) | 0.05 | 0.05 | 0.05 | 0.05 | 0.05 | 0.05 |
| Simultaneous biaxial stretching temperature (° C.) | 160 | 155 | 155 | 160 | 160 | 160 |
| Simultaneous biaxial stretching ratio | 5 × 5 | 5 × 5 | 5 × 5 | 5 × 5 | 5 × 5 | 5 × 5 |
| Tmh (° C.) | 169 | 163 | 163 | 170 | 170 | 169 |
| Tml (° C.) | 163 | 140 | 137 | 140 | 140 | 140 |
| Tmh − Tml (° C.) | 6 | 23 | 26 | 30 | 30 | 29 |

TABLE 2

| | Examples | | | | | | |
|---|---|---|---|---|---|---|---|
| | 1 A/B/A/B/.../A | 2 A/C/A/C/.../A | 3 AB-1/AB-1/.../A | 4 AB-1/AB-1/.../A | 5 AB-1/AB-1/.../A | 6 AB-2/AB-2/.../A | 7 AC/AC/.../AC/A |
| Number of biaxially oriented film | 21 | 21 | 21 | 21 | 84 | 21 | 21 |
| Sheet thickness (mm) | 1 | 1 | 1 | 1 | 4 | 1 | 1 |
| Layer ratio (Dh/Dl) | 1.1 | 1.1 | 10.5 | 10.5 | 10.2 | 21 | 10.5 |
| Heating roll temperature T(° C.) | 155 | 155 | 155 | 155 | 160 | 155 | 155 |

TABLE 2-continued

|  |  |  |  |  |  |  |  |
|---|---|---|---|---|---|---|---|
| Take-up speed for heating roll forming (m/min) | 0.1 | 0.1 | 0.1 | 1 | 0.1 | 0.1 | 0.1 |
| Tmh (° C.) | 169 | 169 | 169 | 169 | 169 | 169 | 169 |
| Tml (° C.) | 140 | 142 | 140 | 140 | 140 | 140 | 137 |
| Tmh − Tml (° C.) | 29 | 27 | 29 | 29 | 29 | 29 | 32 |
| $Tm_{out} - T$ | 14 | 14 | 14 | 14 | 9 | 14 | 14 |
| Scattering peak in $I_x^V$ | Present | Present | Present | Present | Present | Present | Present |
| Rigidity |  |  |  |  |  |  |  |
| Tensile modulus (MPa) | 3,100 | 3,220 | 3,120 | 3,090 | 3,480 | 3,120 | 3,250 |
| Cold impact resistance |  |  |  |  |  |  |  |
| In-plane impact strength (−30° C.)(J) | 24 | 25 | 23 | 23 | >30 | 23 | 25 |
| Transparency |  |  |  |  |  |  |  |
| Total haze (%) | 17 | 16 | 15 | 19 | 21 | 16 | 14 |
| Internal haze (%) | 15 | 14 | 13 | 15 | 18 | 14 | 12 |
| External haze (%) | 2 | 2 | 2 | 4 | 3 | 2 | 2 |
| Laminated state | a | a | a | a | a | a | a |

|  |  | Examples |  |  |  |  |
|---|---|---|---|---|---|---|
|  |  | 8<br>DB/<br>DB/.../<br>DB/D | 9<br>DC/<br>DC/.../<br>DC/D | 10<br>EB-1/EB-<br>1/.../<br>EB-1/E | 11<br>EB-2/EB-<br>2/.../<br>EB-2/E | 12<br>A/BAB/<br>BAB/.../<br>BAB/A |
|  | Number of biaxially oriented film | 21 | 21 | 21 | 21 | 21 |
|  | Sheet thickness (mm) | 1 | 1 | 1 | 1 | 1 |
|  | Layer ratio (Dh/Dl) | 10.5 | 10.5 | 6.0 | 10.5 | 4.5 |
|  | Heating roll temperature T(° C.) | 155 | 155 | 155 | 155 | 155 |
|  | Take-up speed for heating roll forming (m/min) | 0.1 | 0.1 | 0.1 | 0.1 | 0.1 |
|  | Tmh (° C.) | 163 | 163 | 170 | 170 | 169 |
|  | Tml (° C.) | 140 | 137 | 140 | 140 | 140 |
|  | Tmh − Tml (° C.) | 23 | 26 | 30 | 30 | 29 |
|  | $Tm_{out} - T$ | 8 | 8 | 15 | 15 | 14 |
|  | Scattering peak in $I_x^V$ | Present | Present | Present | Present | Present |
|  | Rigidity |  |  |  |  |  |
|  | Tensile modulus (MPa) | 2,890 | 2,990 | 2,980 | 3,010 | 2,900 |
|  | Cold impact resistance |  |  |  |  |  |
|  | In-plane impact strength (−30° C.)(J) | 26 | 27 | 27 | 27 | 25 |
|  | Transparency |  |  |  |  |  |
|  | Total haze (%) | 14 | 14 | 14 | 14 | 15 |
|  | Internal haze (%) | 12 | 12 | 12 | 12 | 13 |
|  | External haze (%) | 2 | 2 | 2 | 2 | 2 |
|  | Laminated state | a | a | a | a | a |

|  |  | Comparative Examples |  |  |  |  |  |  |  |  |  |  |
|---|---|---|---|---|---|---|---|---|---|---|---|---|
|  |  | 1<br>A/<br>A/.../<br>A | 2<br>A/<br>A/.../<br>A | 3<br>B/<br>B/.../<br>B | 4<br>B/<br>B/.../<br>B | 5<br>C/<br>C/.../<br>C | 6<br>D/<br>D/.../<br>D | 7<br>E/<br>E/.../<br>E | 8<br>E/<br>E/.../<br>E | 9<br>A/D/A/<br>D/.../<br>A | 10<br>AD/<br>AD/...<br>AD/A | 11<br>AD/<br>AD/...<br>AD/A |
|  | Number of biaxially oriented film | 21 | 21 | 21 | 21 | 21 | 21 | 21 | 21 | 21 | 21 | 21 |
|  | Sheet thickness (mm) | 1 | 1 | 1 | 1 | 1 | 1 | 1 | 1 | 1 | 1 | 1 |

TABLE 2-continued

| | | | | | | | | | | | |
|---|---|---|---|---|---|---|---|---|---|---|---|
| Heating roll temperature T(° C.) | 155 | 166 | 125 | 138 | 135 | 155 | 155 | 170 | 155 | 155 | 167 |
| Take-up speed for heating roll forming (m/min) | 0.1 | 0.1 | 0.1 | 0.1 | 0.1 | 0.1 | 0.1 | 0.1 | 0.1 | 0.1 | 0.1 |
| Tmh (° C.) | 169 | 169 | 140 | 140 | 137 | 163 | 170 | 170 | 169 | 169 | 169 |
| Tml (° C.) | 169 | 169 | 140 | 140 | 137 | 163 | 170 | 170 | 163 | 163 | 163 |
| Tmh − Tml (° C.) | 0 | 0 | 0 | 0 | 0 | 0 | 0 | 0 | 6 | 6 | 6 |
| $Tm_{out}$ − T | 14 | 3 | 15 | 2 | 2 | 8 | 15 | 0 | 14 | 14 | 2 |
| Scattering peak in $I_X^V$ | Present | Absent | Present | Absent | Absent | Present | Present | Absent | Present | Present | Absent |
| Rigidity | | | | | | | | | | | |
| Tensile modulus (MPa) | 2,200 | — | 1,500 | — | — | 1,880 | 2,250 | — | 2,150 | 2,300 | — |
| Cold impact resistance | | | | | | | | | | | |
| In-plane impact strength (−30° C.)(J) | — | — | — | — | — | — | — | — | 16 | 18 | — |
| Transparency | | | | | | | | | | | |
| Total haze (%) | 28 | — | 30 | — | — | 27 | 28 | — | 25 | 25 | — |
| Internal haze (%) | 26 | — | 29 | — | — | 26 | 26 | — | 23 | 23 | — |
| External haze (%) | 2 | — | 1 | — | — | 1 | 2 | — | 2 | 2 | — |
| Laminated state | c | d | c | d | d | c | c | d | b | b | d |

Table 2 reveals that the sheet obtained by the production method of the present invention has excellent transparency and mechanical properties. In Examples 1 to 12, a multilayer structure, which did not include delamination between layers at all, could be observed. On the other hand, in Comparative Examples 9 and 10, partial delamination occurred due to application of force during slicing off the section with a microtome. For the tensile modulus, it is conceived that the obtained numeral value became low due to occurrence of delamination during measurement. In Comparative Examples 1, 3, 6, and 7, layers were completely delaminated by only applying a slight force, so that the section could not be sliced off well with a microtome. It is conceived that the obtained numeral value became low due to occurrence of delamination during tensile modulus measurement. In Comparative Examples 2, 4, 5, 8, and 11, the sheets were melted by the stretching roll, and therefore a multilayer structure could not be observed in the obtained sheets.

REFERENCE SIGNS LIST

1 Polypropylene sheet
2 Incident X ray
20 Beam size at sample irradiation position

The invention claimed is:

1. A method for producing a polypropylene sheet having a thickness of 0.5 to 5 mm, the method comprising:
   a step 1 of preparing a precursor in which a first biaxially oriented polypropylene film having a thickness of less than 0.15 mm and a melting point Tmh and a second biaxially oriented polypropylene film having a thickness of less than 0.15 mm and a melting point of Tml are alternately laminated with each other; and
   a step 2 of bringing a heating element into contact with outermost layers of the precursor to thermally seal each of the first biaxially oriented polypropylene film and the second biaxially oriented polypropylene film in the precursor with each other, wherein
   Tmh−Tml≥8 (° C.), where Tmh and Tml are measured by a differential scanning calorimeter (DSC) under conditions from 30° C. to 230° C. and a heating rate of 10° C./min,
   wherein the polypropylene sheet comprises layers derived from the first biaxially oriented polypropylene film and the second biaxially oriented polypropylene film, and
   wherein a melting point $Tm_{out}$ of both outermost layers of the precursor and a temperature T of the heating element satisfies the following condition:

$$Tm_{out}-T\geq 4(° C.).$$

2. The production method according to claim 1, wherein the melting point $Tm_{out}$ of the outermost layers and the temperature T of the heating element satisfies the following condition:

$$Tm_{out}-T\geq 8(° C.).$$

3. The production method according to claim 1, wherein the heating element comprises a heating roll.

4. The production method according to claim 1, wherein, in the polypropylene sheet, a ratio Dh/Dl is 1 to 30, where Dh is a thickness of a layer attributed to the first biaxially oriented polypropylene film, and Dl is a thickness of a layer attributed to the second biaxially oriented polypropylene film.

5. The production method according to claim 1, wherein the polypropylene sheet has an integrated intensity $I_X^V$ profile having a scattering peak observed in a range of 2θ=0.2° to 1.0°, wherein
   the integrated intensity $I_X^V$ profile is obtained by the process comprising:
   causing an X-ray having a wavelength of 0.154 nm to be incident in a cross section of the sheet,
   forming a two-dimensional small angle X-ray scattering profile from the incident X-ray, and
   integrating intensities of the scattering profile in a region ±30° with respect to the equator of the scattering profile to determine the integrated intensity $I_X^V$ profile.

6. The production method according to claim 1, wherein the step 1 includes a step of coextruding a raw material of the first biaxially oriented polypropylene film and a raw material of the second biaxially oriented polypropylene film to prepare an original sheet having a plurality of layers, and biaxially stretching the original sheet to prepare the precursor.

7. A method for producing a formed article, the method comprising preparing a polypropylene sheet by the method according to claim 1, and forming the polypropylene sheet into a desired shape to form the formed article.

8. A method for producing a polypropylene sheet having a thickness of 0.5 to 5 mm, the method comprising;
   a step 1 of preparing a precursor in which a first biaxially oriented polypropylene film having a thickness of less than 0.15 mm and a melting point Tmh and a second biaxially oriented polypropylene film having a thickness of less than 0.15 mm and a melting point of Tml that are alternately laminated with each other; and
   a step 2 of bringing a heating element into contact with outermost layers of the precursor to thermally seal the first and second biaxially oriented polypropylene films with each other,
   wherein Tmh−Tml≥8 (° C.) where Tmh and Tml are measured by a differential scanning calorimeter (DSC) under conditions from 30° C. to 230° C. and a heating rate of 10° C./min,
   wherein the precursor provides the polypropylene sheet with the first biaxially oriented polypropylene film and the second biaxially oriented polypropylene film alternately laminated with each other, and
   wherein a melting point $Tm_{out}$ of both outermost layers of the precursor and a temperature T of the heating element satisfies the following condition:

$$Tm_{out} - T \geq 4 (° C.).$$

9. The production method according to claim 8, wherein the melting point $Tm_{out}$ of the outermost layers and the temperature T of the heating element satisfies the following condition:

$$Tm_{out} - T \geq 8 (° C.).$$

* * * * *